(12) United States Patent
Pan et al.

(10) Patent No.: US 10,444,611 B2
(45) Date of Patent: Oct. 15, 2019

(54) PROJECTOR AND ILLUMINATION SYSTEM THEREOF

(71) Applicant: Coretronic Corporation, Hsin-Chu (TW)

(72) Inventors: Haw-Woei Pan, Hsin-Chu (TW); Chih-Hsien Tsai, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/186,419

(22) Filed: Nov. 9, 2018

(65) Prior Publication Data

US 2019/0163043 A1 May 30, 2019

(30) Foreign Application Priority Data

Nov. 28, 2017 (CN) .......................... 2017 1 1213259

(51) Int. Cl.
*G03B 21/14* (2006.01)
*H04N 9/31* (2006.01)
*G03B 21/20* (2006.01)

(52) U.S. Cl.
CPC ....... *G03B 21/2066* (2013.01); *G03B 21/204* (2013.01); *G03B 21/208* (2013.01)

(58) Field of Classification Search
CPC .. G03B 21/14; G03B 21/208; G03B 21/2066; G03B 21/204
See application file for complete search history.

(56) References Cited

U.S. PATENT DOCUMENTS

| | | | | |
|---|---|---|---|---|
| 2011/0234923 | A1* | 9/2011 | Yamagishi | G03B 21/204 348/757 |
| 2012/0062857 | A1* | 3/2012 | Saitou | G02B 5/22 353/98 |
| 2013/0250255 | A1 | 9/2013 | Kurosaki et al. | |
| 2013/0322056 | A1 | 12/2013 | Konuma et al. | |
| 2014/0071407 | A1 | 3/2014 | Takahashi et al. | |
| 2015/0226389 | A1* | 8/2015 | Kasugai | G02B 26/008 353/31 |
| 2018/0080626 | A1* | 3/2018 | Hu | F21V 7/22 |

FOREIGN PATENT DOCUMENTS

| | | |
|---|---|---|
| CN | 204593250 U | 8/2015 |
| CN | 103792768 B | 9/2015 |

* cited by examiner

*Primary Examiner* — William C. Dowling

(57) ABSTRACT

An illumination system includes an exciting light source, a first lens set, a dichroic element, a wavelength-converting element and a beam splitter. The exciting light source emits an excitation beam. The dichroic element reflects the excitation beam to the first lens set. The first lens set has an optical axis. The excitation beam is incident into the first lens set in a direction parallel to the optical axis and passes through the first lens set. The beam axis of the excitation beam is noncoaxial with the optical axis. The wavelength-converting element has a reflective region and a wavelength-converting region. The wavelength-converting region converts the excitation beam into a converted beam, which passes through the dichroic element and the beam splitter. The reflective region reflects the excitation beam to the first lens set and the beam splitter. The beam splitter splits the excitation beam into two branch excitation beams.

22 Claims, 10 Drawing Sheets

PROJECTOR AND ILLUMINATION SYSTEM THEREOF

CROSS-REFERENCE TO RELATED APPLICATION

THIS APPLICATION CLAIMS THE PRIORITY BENEFIT OF CHINA APPLICATION (CN201711213259.4 FILED ON Nov. 28, 2017). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a projector and an illumination system thereof.

BACKGROUND OF THE INVENTION

The current projectors often have many optical elements (e.g., lenses and mirrors) as well as long and complicated optical paths. In order to accommodate these optical elements and the optical paths, the projector described above generally has a large volume. However, currently, the projectors are developed towards smaller volume. Therefore, designing projectors smaller than the current average projectors is an issue that many manufacturers are interested in.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an illumination system that can help projectors toward miniaturization.

The invention further provides a projector including the above illumination system. The illumination system helps to improve the color uniformity of the image.

The advantages of the invention can be further understood from the technical features disclosed in the invention.

The projector provided by the invention includes an illumination system, a light valve and a projection lens. The illumination system includes an exciting light source, a first lens set, a first dichroic element, a wavelength-converting element and a beam splitter. The exciting light source is configured to emit an excitation beam, wherein the excitation beam has a beam axis. The first lens set has a first optical axis. The first dichroic element is on a transmission path of the excitation beam and located between the first lens set and the exciting light source. The first dichroic element is configured to reflect the excitation beam and transmit the excitation beam to the first lens set. The excitation beam is incident into the first lens set in a direction parallel to the first optical axis. The beam axis of the excitation beam incident into the first lens set is noncoaxial with the first optical axis of the first lens set. The wavelength-converting element is located on a transmission path of the excitation beam transmitted from the first lens set and has a reflective region and a wavelength-converting region. When the wavelength-converting region is located on a transmission path of the excitation beam, the wavelength-converting region is configured to convert the excitation beam into a converted beam and reflect the converted beam to the first lens set. The converted beam transmitted from the first lens set is used to pass through the first dichroic element. When the reflective region is on a transmission path of the excitation beam, the reflective region is configured to reflect the excitation beam back to the first lens set. The beam splitter is located on a transmission path of the excitation beam and the converted beam transmitted from the first lens set and is configured to split the excitation beam into a first branch excitation beam and a second branch excitation beam. The beam splitter allows the first branch excitation beam to pass therethrough and reflects the second branch excitation beam to the first dichroic element. The beam axis of the excitation beam incident onto the beam splitter from the first lens set is noncoaxial with the beam axis of the excitation beam incident into the first lens set from the first dichroic element. The converted beam transmitted from the first lens set is used to pass through the beam splitter. The light valve is disposed on a transmission path of an illumination beam and configured to convert the illumination beam into an image beam. The projection lens is disposed on a transmission path of the image beam.

In addition, the invention further provides the above illumination system. The illumination system includes an exciting light source, a first lens set, a first dichroic element, a wavelength-converting element and a beam splitter. The exciting light source is configured to emit an excitation beam, wherein the excitation beam has a beam axis. The first lens set has a first optical axis. The first dichroic element is on a transmission path of the excitation beam and located between the first lens set and the exciting light source. The first dichroic element is configured to reflect the excitation beam and transmit the excitation beam to the first lens set. The excitation beam is incident into the first lens set in a direction parallel to the first optical axis. The beam axis of the excitation beam incident into the first lens set is noncoaxial with the first optical axis of the first lens set. The wavelength-converting element is located on a transmission path of the excitation beam transmitted from the first lens set and has a reflective region and a wavelength-converting region. When the wavelength-converting region is located on a transmission path of the excitation beam, the wavelength-converting region is configured to convert the excitation beam into a converted beam and reflect the converted beam to the first lens set. The converted beam transmitted from the first lens set is used to pass through the first dichroic element. When the reflective region is on a transmission path of the excitation beam, the reflective region is configured to reflect the excitation beam back to the first lens set. The beam splitter is located on a transmission path of the excitation beam and the converted beam transmitted from the first lens set and is configured to split the excitation beam into a first branch excitation beam and a second branch excitation beam. The beam splitter allows the first branch excitation beam to pass therethrough and reflects the second branch excitation beam to the first dichroic element. The beam axis of the excitation beam incident onto the beam splitter from the first lens set is noncoaxial with the beam axis of the excitation beam incident into the first lens set from the first dichroic element. The converted beam transmitted from the first lens set is used to pass through the beam splitter.

In summary, the excitation beam enters the first lens set in the direction parallel to the first optical axis, and the beam axis of the excitation beam and the optical axis of the first lens sets are noncoaxial, so that the two excitation beams from the first dichroic element and the reflective region of the wavelength-converting element respectively enter two different parts of the first lens set along different transmission paths. Therefore, the excitation beam passes through the first lens set twice to favorably narrow the distribution range of the transmission path of the excitation beam, thereby facilitating the miniaturization of the projector.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
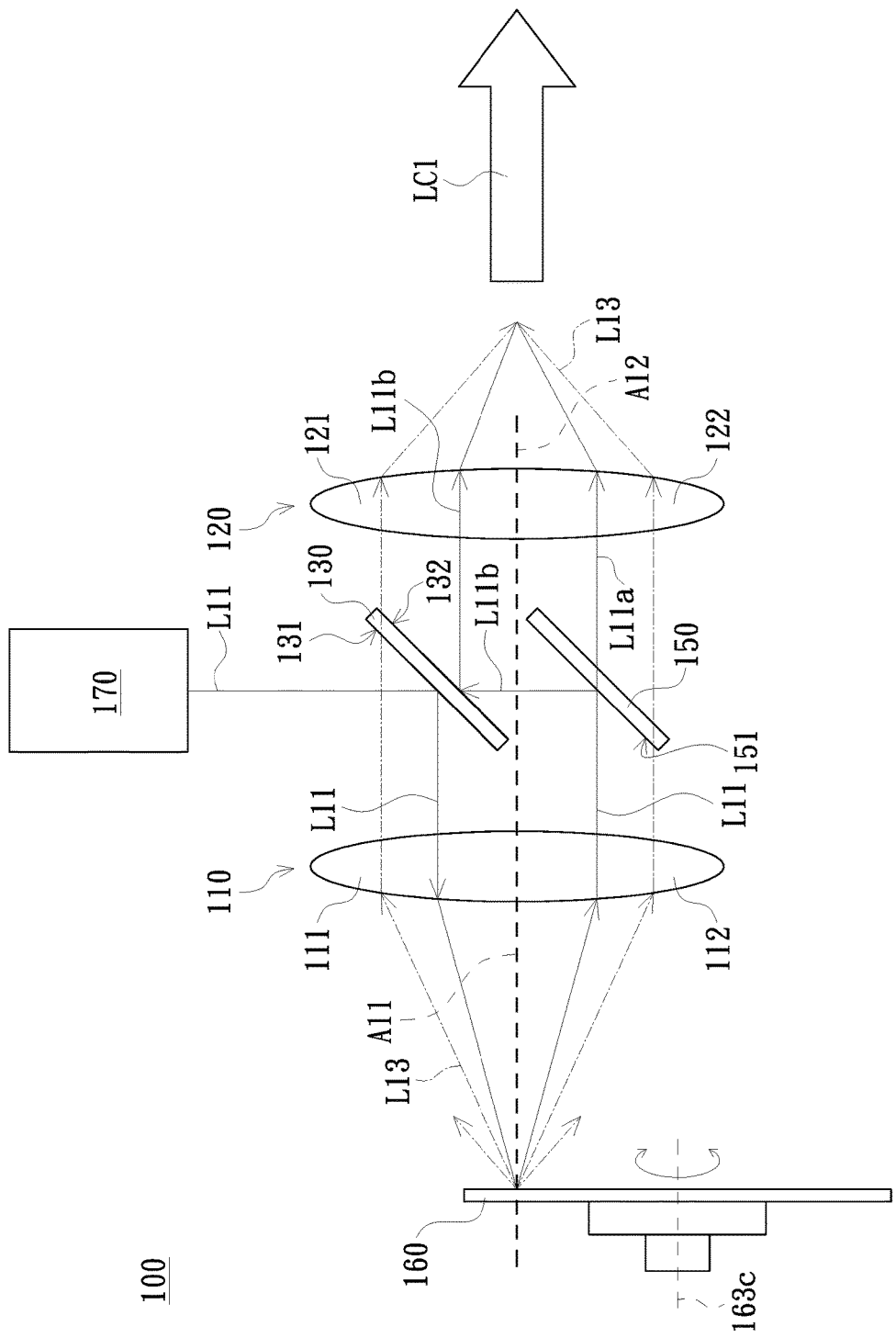
FIG. 1A is a schematic view of an illumination system in accordance with an embodiment of the invention.

FIG. 1A is a schematic view of an illumination system in accordance with an embodiment of the invention. Referring to FIG. 1A, the illumination system 100 includes a first lens set 110, a second lens set 120, a first dichroic element 130 and a beam splitter 150. The first lens set 110 and the second lens set 120 are disposed face to face and symmetrically to each other. The first dichroic element 130 and the beam splitter 150 are disposed between the first lens set 110 and the second lens set 120. In the embodiment shown in FIG. 1A, each of the first lens set 110 and the second lens set 120 includes one lens. That is, the first lens set 110 is a lens, and the second lens set 120 is another lens. The first lens set 110 and the second lens set 120 may both be convex lenses, as shown in FIG. 1A. However, in other embodiments, the first lens set 110 and the second lens set 120 may each include at least two lenses. Therefore, the number of lenses included in each of the first lens set 110 and the second lens set 120 is not limited to one.

The first lens set 110 has a first optical axis A11 and the second lens set 120 has a second optical axis A12, wherein the first optical axis A11 and the second optical axis A12 may be coaxial. That is, the first lens set 110 and the second lens set 120 are arranged along a reference line that substantially passes through the centers of the first lens set 110 and the second lens set 120, as shown by the first optical axis A11 and the second optical axis A12 in FIG. 1A. However, it should be noted that errors are inevitably generated when assembling the first lens set 110 and the second lens set 120, resulting in the first optical axis A11 and the second optical axis A12 being slightly noncoaxial. If the condition of being slightly noncoaxial does not make difference on the basic function of the illumination system 100, this condition of being slightly noncoaxial may also belongs to the case described above in which the first optical axis A11 and the second optical axis A12 are coaxial.

The illumination system 100 further includes an exciting light source 170 capable of emitting an excitation beam L11. The exciting light source 170 may be a laser light source, such as a laser diode (LD) or a laser bank array composed of a plurality of laser diodes, and therefore, the excitation beam L11 may be a laser beam. The excitation beam L11 has a beam axis which is equivalent to the transmission path of the chief ray of the excitation beam L11. In the drawings (including FIG. 1A) of the present application, the chief ray of the excitation beam L11 is represented by a straight line, and the excitation beam L11 is represented by the chief ray (i.e., the above straight line), and therefore the other rays of the excitation beam L11 such as the marginal ray are omitted. In addition, in the drawings of the present application, the straight line representing the excitation beam L11 also represents the transmission path of the excitation beam L11, that is, the excitation beam L11 shown in the figures can be regarded as the transmission path of the excitation beam L11.

The first dichroic element 130 is on the transmission path of the excitation beam L11 and located between the first lens set 110 and the exciting light source 170. The first dichroic element 130 reflects the excitation beam L11 to the first lens set 110. The first dichroic element 130 has a first dichroic surface 131 and a second dichroic surface 132, and the second dichroic surface 132 is opposite to the first dichroic surface 131. The first dichroic surface 131 can reflect the excitation beam L11 to the first lens set 110. The excitation beam L11 reflected by the first dichroic element 130 can be incident into the first lens set 110 in a direction parallel to the first optical axis A11, that is, the beam axis of the excitation beam L11 incident into the first lens set 110 from the first dichroic element 130 is parallel to the first optical axis A11.

In the embodiment shown in FIG. 1A, neither the first optical axis A11 nor the second optical axis A12 passes through the first dichroic element 130, so that the beam axis of the excitation beam L11 reflected by the first dichroic element 130 is parallel to the first optical axis A11 while not coaxial with the first optical axis A11. Therefore, the excitation beam L11 is substantially incident into only the first half part 111 of the first lens set 110 (the upper half of the first lens set 110 as shown in FIG. 1A) while not into the second half part 112 of the first lens set 110 (the lower half of the first lens set 110 as shown in FIG. 1A). Thus, the excitation beam L11 from the first dichroic element 130 does not irradiate the entire first lens set 110.

The illumination system 100 further includes a wavelength-converting element 160 located on the transmission path of the excitation beam L11 transmitted from the first lens set 110. That is, after the excitation beam L11 passes through the first lens set 110, the excitation beam L11 is condensed by the first lens set 110 and incident onto the wavelength-converting element 160 by changing the incident angle of the excitation beam L11. When the excitation beam L11 passes through the first lens set 110, the excitation beam L11 from the first lens set 110 is not incident onto the wavelength-converting element 160 along the direction parallel to the first optical axis A11.

Figure 1B:
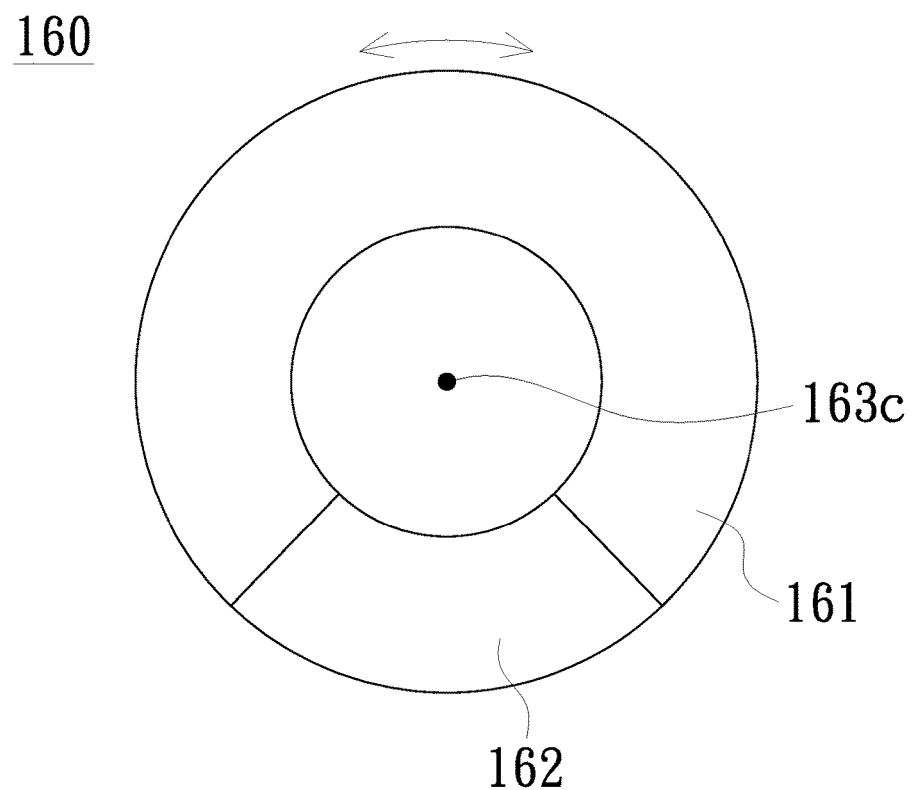
FIG. 1B is a front view of the wavelength-converting element in FIG. 1A.

Referring to FIGS. 1A and 1B, the wavelength-converting element 160 may be a phosphor wheel. The overall shape of the wavelength-converting element 160 may be disc-shaped, and FIG. 1B illustrates the front of the wavelength-converting element 160. The wavelength-converting element 160 is rotatable with respect to the first lens set 110, wherein the wavelength-converting element 160 is rotated around the rotation axis 163c. In the embodiment, the rotation axis 163c may be parallel to the first optical axis A11 and the second optical axis A12, but noncoaxial with the first optical axis A11 or the second optical axis A12.

The wavelength-converting element 160 has a reflective region 161 and a wavelength-converting region 162. Since the wavelength-converting element 160 can rotate with respect to the first lens set 110, the position where the excitation beam L11 irradiates the wavelength-converting element 160 can be changed by rotating the wavelength-converting element 160, so that the reflective region 161 or the wavelength-converting region 162 is selectively located on the transmission path of the excitation beam L11, so as to determine whether the excitation beam L11 is incident onto the reflective region 161 or the wavelength-converting region 162.

The wavelength-converting element 160 may include a substrate (not shown) and a phosphor powder (not shown). The substrate is, for example, a metal plate, which has a reflective surface with a good reflectivity. The phosphor powder is distributed on the reflective surface of the substrate and disposed in the wavelength-converting region 162 and not in the reflective region 161. That is, the phosphor powder covers the reflective surface located within the wavelength-converting region 162 and does not cover the reflective surface within the reflective region 161. However, the invention is not limited thereto. In other embodiments, phosphor powder may be additionally disposed in the reflective region 161 of the wavelength-converting element 160. The concentration of the phosphor powder in the reflective region 161 is different from the concentration of the phosphor powder in the wavelength-converting region 162. Alternatively, the wavelength of the color light excited by the phosphor powder disposed in the reflective region 161 is different from the wavelength of the color light excited by the phosphor powder disposed in the wavelength-converting region 162, such as color lights of different colors.

The excitation beam L11 is incident onto the reflective surface of the reflective region 161 when the reflective region 161 is located on the transmission path of the excitation beam L11, so that the reflective region 161 can reflect the excitation beam L11 back to the first lens set 110. The excitation beam L11 reflected by the reflective region 161 may be further reflected back to the first lens set 110 along the direction parallel to the first optical axis A11, so that the beam axis of the excitation beam L11 may be also parallel to the first optical axis A11.

The beam axis of the excitation beam L11 reflected by the reflective region 161 is noncoaxial with the first optical axis A11, and the excitation beam L11 reflected by the reflective region 161 enters and passes through the second half part 112 of the first lens set 110, while not entering the first half part 111. The excitation beam L11 transmitted from the first lens set 110 enters the beam splitter 150 while not entering the first color filter 130, as shown in FIG. 1A. In other words, the beam axis of the excitation beam L11 incident onto the beam splitter 150 from the first lens set 110 is parallel to but noncoaxial with the beam axis of the excitation beam L11 incident into the first lens set 110 from the first dichroic element 130.

The excitation beam L11 is incident onto the phosphor powder located in the wavelength-converting region 162 when the wavelength-converting region 162 is located on the transmission path of the excitation beam L11. The phosphor powder can absorb the energy of the excitation beam L11 and converts the excitation beam L11 into a converted beam L13, wherein the wavelength of the converted beam L13 is different from the wavelength of the excitation beam L11. The converted beam L13 is reflected by the reflective surface of the substrate so that the converted beam L13 leaves the wavelength-converting region 162 and is transmitted toward the first lens set 110. Thus, it is known that the wavelength-converting region 162 converts the excitation beam L11 into the converted beam L13 and reflects the converted beam L13 to the first lens set 110 when the wavelength-converting region 162 is located on the transmission path of the excitation beam L11.

It should be noted that the phosphor powder in the wavelength-converting region 162 can scatter light rays, and thus the converted beam converted by the wavelength-converting region 162 is scattered light rays and may present a Lambertian distribution, so that the converted beam L13 from the wavelength-converting region 162 is a diverging beam. The converted beam L13 passes through the first half part 111 and the second half part 112 of the first lens set 110 and is converged by the first lens set 110, so that the converted beam L13 is converged into a parallel beam and is transmitted in a direction parallel to the first optical axis A11 and the second optical axis A12. The beam axis of the converged converted beam L13 can be close to or overlap with the first optical axis A11, therefore, the converted beam L13 transmitted from the first lens set 110 irradiates both the first dichroic element 130 and the beam splitter 150. In addition, the converted beam L13 passes through the first dichroic element 130.

Both the excitation beam L11 and the converted beam L13 transmitted from the first lens set 110 are incident onto the beam splitter 150. Therefore, the beam splitter 150 is located on the transmission path of the excitation beam L11 and the converted beam L13 transmitted from the first lens set 110. Although both the excitation beam L11 and the converted beam L13 are incident onto the beam splitter 150, they may behave differently due to the beam splitter 150. Specifically, the beam splitter 150 allows the converted beam L13 to pass therethrough but splits the excitation beam L11 into two parts, a first branch excitation beam L11a and a second branch excitation beam L11b. In addition, the beam splitter 150 does not change the wavelength of the excitation beam L11, that is, the wavelengths of the first branch excitation beam L11a, the second branch excitation beam L11b and that of the excitation beam L11 are identical.

Regarding the effect of the beam splitter 150 on the excitation beam L11, the beam splitter 150 allows the first branch excitation beam L11a to pass therethrough and reflects the second branch excitation beam L11b to the first dichroic element 130. Specifically, the beam splitter 150 has a beam splitting surface 151. The beam splitting surface 151 can reflect the second branch excitation beam L11b to the second dichroic surface 132 of the first dichroic element 130 and allows the first branch excitation beam L11a to pass therethrough. In addition, the second dichroic surface 132 reflects the second branch excitation beam L11b and transmits it to the second lens set 120.

The second dichroic surface 132 may be parallel to the beam splitting surface 151 so that the first branch excitation beam L11a and the second branch excitation beam L11b are incident into the second lens set 120 in a direction parallel to the second optical axis A12. The first branch excitation beam L11a has a first sub-beam axis and the second branch excitation beam L11b has a second sub-beam axis. The straight lines representing the first branch excitation beam L11a and the second branch excitation beam L11b in FIG. 1A may be regarded as the first sub-beam axis and the second sub-beam axis, respectively.

Neither the first optical axis A11 nor the second optical axis A12 passes through the beam splitter 150, so that the second optical axis A12 is located between the first sub-beam axis of the first branch excitation beam L11a and the second sub-beam axis of the second branch excitation beam L11b. Therefore, the first branch excitation beam L11a and the second branch excitation beam L11b respectively pass through the fourth half part 122 and the third half part 121 of the second lens set 120. It can be seen from the above that the beam splitter 150 splits the excitation beam L11 into two branch beams (the first branch excitation beam L11a and the second branch excitation beam L11b), so that the two branch beams respectively pass through the two half parts of the second lens sets 120 (the third half part 121 and the fourth half part 122). In other words, the beam splitter 150 and the second dichroic surface 132 of the first dichroic element 130 substantially allows the excitation beam L11 to irradiate both the two half parts of the second lens element 120, so as to prevent the excitation beam L11 from irradiating only one half part of the second lens set 120. As a result, the color uniformity of the image is improved, and the quality of the image is such improved or at least maintained.

Figure 1C:
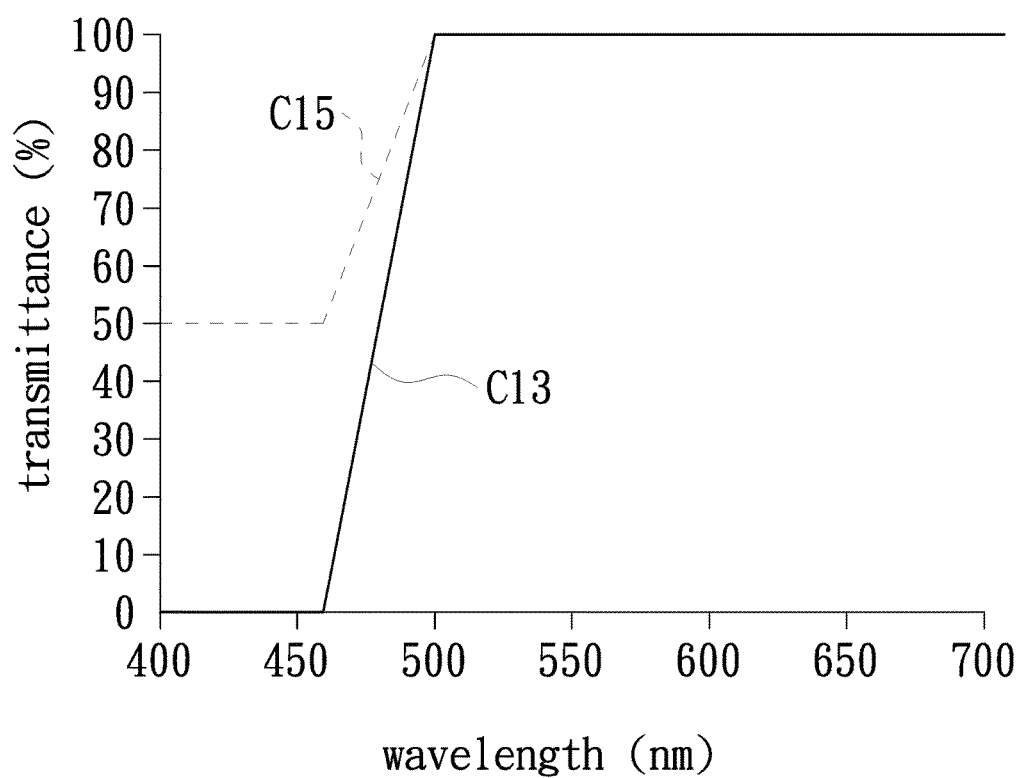
FIG. 1C is a schematic diagram of the transmittances of the first dichroic element and the beam splitter in FIG. 1A, where the transmittances vary with the wavelength.

FIG. 1C is a schematic diagram of the transmittances of the first dichroic element and the beam splitter in FIG. 1A, where the transmittances vary with wavelength, and wherein the line segments C13 and C15 respectively represent the transmittances of the first dichroic element 130 and the beam splitter 150 varying with wavelength. However, it should be noted that the line segments C13 and C15 in FIG. 1C are only used to illustrate that the first dichroic element 130 and the beam splitter 150 will reflect or allow light to pass therethrough based on the wavelength of incident light.

In addition, although FIG. 1C discloses the transmittances of the first dichroic element 130 and the beam splitter 150 and does not disclose the reflectivity of the first dichroic element 130 or the beam splitter 150, the relationship between the reflectivity and the transmittance is negative correlation. That is, the lower the transmittance is, the higher the reflectivity is, and the higher the transmittance is, the lower the reflectivity is. Therefore, even though FIG. 1C does not disclose the reflectivity of the first dichroic element 130 or the beam splitter 150, a person skilled in the art can appreciate the overall change of reflectivity from the change of the transmittance.

As shown in FIG. 1C, it can be seen that the transmittance of the light ray with a wavelength lower than 460 nm to the first dichroic element 130 (line segment C13) is zero, but the transmittance of the light ray with a wavelength greater than 500 nm to the first dichroic element 130 (line segment C13) is 100%. This means that the first dichroic element 130 reflects the light ray less than 460 nm in wavelength and allows the light ray above 500 nm in wavelength to pass therethrough. The transmittance of the light ray having a wavelength lower than 460 nm to the beam splitter 150 (line segment C15) is 50%, but the transmittance of the light ray having a wavelength greater than 500 nm to the beam splitter 150 (line segment C15) is 100%. Therefore, the beam splitter 150 will allow the light ray having a wavelength greater than 500 nm to pass therethrough and split the light ray having a wavelength lower than 460 nm into two beams of light rays.

According to the line segments C13 and C15 shown in FIG. 1C, the exciting light source 170 may select a blue light source to provide blue light having a wavelength of, for example, 445 nm or 454 nm and the wavelength-converting region 162 of the wavelength-converting element 160 may select a phosphor powder capable of generating a converted beam L3 with a wavelength greater than 500 nm. Thus, the first dichroic element 130 can reflect the excitation beam L11 and the second branch excitation beam L11b, while allow the converted beam L13 to pass therethrough. The beam splitter 150 can also allow the converted beam L13 to pass therethrough and split the excitation beam L11 into the first branch excitation beam L11a and the second branch excitation beam L11b. Further, the first dichroic surface 131 and the second dichroic surface 132 of the first dichroic element 130 reflect the excitation beam L11 and the second branch excitation beam L11b, respectively.

Referring to FIG. 1A, the second lens set 120 is located on the transmission path of the converted beam L13 transmitted from the first dichroic element 130 and the beam splitter 150, the first branch excitation beam L11a transmitted from the beam splitter 150 and the second branch excitation beam L11b transmitted from the first dichroic element 130. Therefore, the second lens set 120 can receive the converted beam L13, the first branch excitation beam L11a and the second branch excitation beam L11b from the first dichroic element 130 and the beam splitter 150.

Since having a function of converging light, the second lens set 120 can converge the converted beam L13, the first branch excitation beam L11a and the second branch excitation beam L11b into an illumination beam LC1. Thus, the illumination system 100 can be applied to the projector and provides the illumination beam LC1 to the light valve (not shown in all FIGS. 1A to 1C), so that the projector can project an image.

Figure 2A:
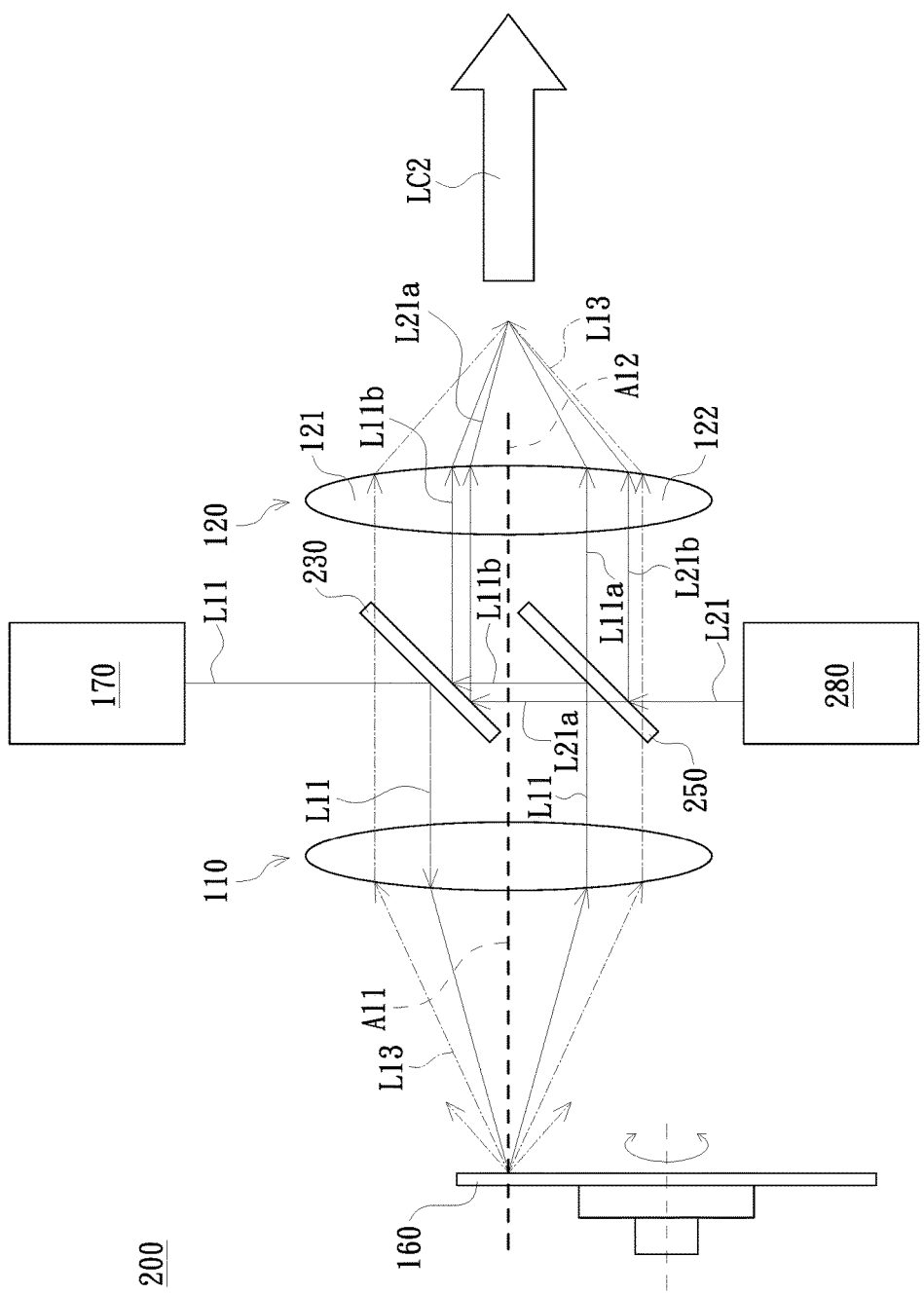
FIG. 2A is a schematic view of an illumination system in accordance with another embodiment of the invention.

FIG. 2A is a schematic view of an illumination system in accordance with another embodiment of the invention. Referring to FIG. 2A, the illumination system 200 shown in FIG. 2A is similar to the illumination system 100 shown in FIG. 1A. For example, the illumination systems 100 and 200 include the same elements, such as the first lens set 110 and the second lens set 120. However, there are still differences between the illumination systems 200 and 100. For example, the illumination system 200 further includes a supplemental light source 280 that does not appear in the illumination system 100 of FIG. 1A. The supplemental light source 280 may be a laser light source, such as a laser diode. Therefore, the supplemental beam L21 emitted by the supplemental light source 280 may also be a laser beam, wherein the supplemental beam L21 has a red wavelength range. In other embodiments, the supplemental light source 280 may be a light emitting diode (LED).

The supplemental light source 280 emits a supplemental beam L21 toward the beam splitter 250, and the beam splitter 250 splits the supplemental beam L21 into two branch supplemental beams L21a and L21b. The beam splitter 250 does not change the wavelength of the supplemental beam L21, that is, the wavelengths of both the branched supplemental beams L21a and L21b are the same as the wavelength of the supplemental beam L21. Similar to FIG. 1A, the chief ray of the supplemental beam L21 is also represented by a straight line in all the figures (including FIG. 2A) of the present application. The chief ray (i.e., the above straight line) represents the supplemental beam L21, and therefore the other rays of the supplemental beam L21 such as the marginal ray are omitted. In addition, in the drawings of the present application, the straight line representing the supplemental beam L21 also represents the transmission path of the supplemental beam L21, that is, the supplemental beam L21 shown in the figures can be regarded as the transmission path of the supplemental beam L21. The straight lines for representing the branched supplemental beams L21a and L21b in FIG. 2A may be regarded as the sub-beam axes of both branch supplemental beams L21a and L21b, respectively.

Figure 2B:
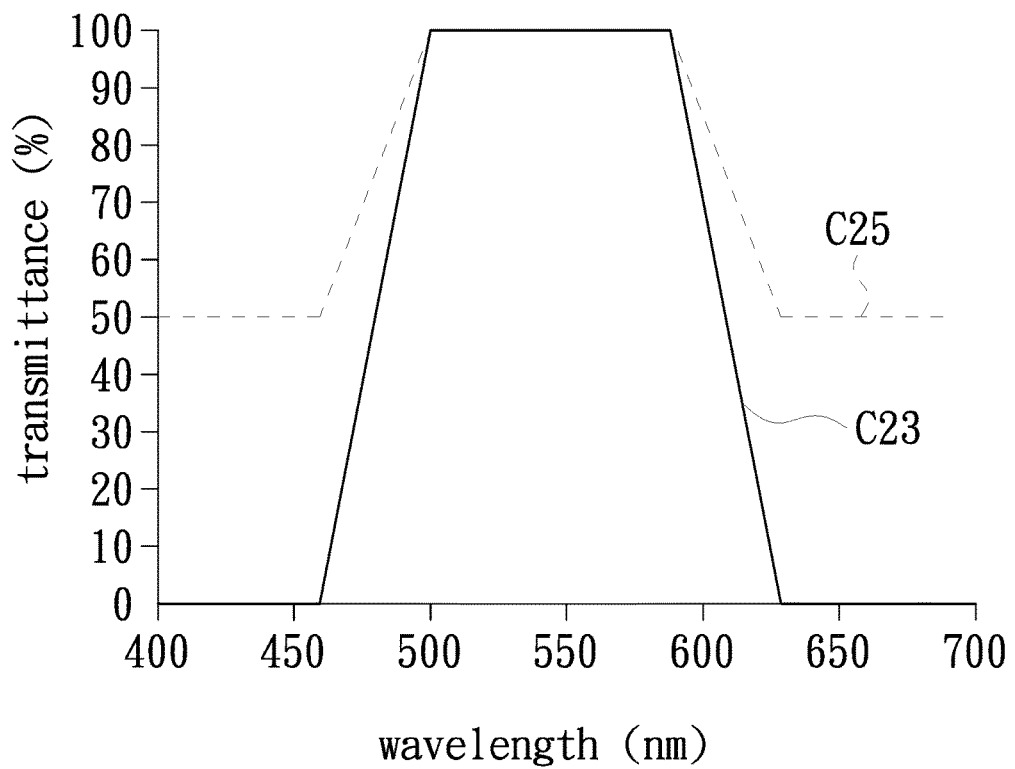
FIG. 2B is a schematic diagram of the transmittances of the first dichroic element and the beam splitter in FIG. 2A, wherein the transmittances vary with wavelength.

Referring to FIG. 2A and FIG. 2B, the first dichroic element 230 and the beam splitter 250 included in the illumination system 200 are also different from the first dichroic element 130 and the beam splitter 150 in the above embodiment, such as the line segments C23 and C25 shown in FIG. 2B. In detail, the line segments C23 and C25 in FIG. 2B respectively represent the transmittances of the first dichroic element 230 and the beam splitter 250, where the transmittances vary with wavelength. However, it should be noted that the line segments C23 and C25 are only used to illustrate that the first dichroic element 230 and the beam splitter 250 will reflect or allow light to pass therethrough based on the wavelength of incident light.

From FIG. 2B, it can be seen that the transmittance of the first dichroic element 230 (line segment C23) for the light ray having a wavelength lower than 460 nanometers (nm) or greater than 630 nm is zero, but the transmittance of the first dichroic element 230 (line segment C23) for the light ray having a wavelength between 500 nm and 600 nm is 100%. This means that the first dichroic element 230 allows the light ray between 500 nm and 600 nm in wavelength to pass therethrough and reflects the light ray less than 460 nm and above 630 nm in wavelength. The transmittance of the beam splitter 250 (line segment C25) for the light ray having a wavelength lower than 460 nm or greater than 630 nm is 50%, but the transmittance of the beam splitter 250 (line segment C25) for the light ray having a wavelength between 500 nm and 600 nm is 100%. Therefore, the beam splitter 250 will allow the light ray having a wavelength higher between 500 nm and 600 nm to pass therethrough and split the light ray having a wavelength lower than 460 nm or greater than 630 nm into two light rays.

According to the line segments C23 and C25 shown in FIG. 2B, the exciting light source 170b may also select a blue light having a wavelength of, for example, 445 nm or 454 nm and the wavelength-converting element 160 may also select a phosphor powder capable of generating a converted beam L13 with a wavelength greater than 500 nm. Thus, the first dichroic element 230 can also reflect the excitation beam L11 and the second branch excitation beam L11b and allow the converted beam L13 to pass therethrough. The beam splitter 250 can also allow the converted beam L13 to pass therethrough and split the excitation beam L11 into the first branch excitation beam L11a and the second branch excitation beam L11b. Further, the first dichroic surface 131 and the second dichroic surface 132 of the first dichroic element 130 reflect the excitation beam L11 and the second branch excitation beam L11b, respectively.

The supplemental light source 280 may select red light with a wavelength greater than 630 nm so that the beam splitter 250 and the first dichroic element 230 can reflect the branch supplemental beams L21a and L21b, respectively. In addition, the beam splitter 250 is not only located between the first lens set 110 and the second lens set 120, but also located between the first dichroic element 230 and the supplemental light source 280, so that the beam splitter 250 and the first dichroic element 230 can respectively reflect the branch supplemental beams L21b and L21a to the second lens set 120. The branch supplemental beams L21b and L21a can pass through the second lens set 120, and the second lens set 120 can converge the converted beam L13, the first branch excitation beam L11a, the second branch excitation beam L11b, the branch supplemental beams L21b and L21a into the illumination beam LC2, which is subsequently converted into image beam by the light valve (not shown in FIGS. 2A and 2B).

In addition, like the first branch excitation beam L11a and second branch excitation beam L11b, the second optical axis A12 of the second lens set 120 is also located between the sub-beam axes of the branch supplemental beams L21a and L21b. Therefore, the branch supplemental beams L21a and L21b also respectively pass through the fourth half part 122 and the third half part 121 of the second lens set 120.

Therefore, the dichroic element 250 substantially allows the supplemental beam L21 to irradiate both the two half parts of the second lens set 120, so as to prevent the supplemental beam L21 from irradiating only one half part of the second lens set 120, thereby improving color uniformity.

Figure 3A:
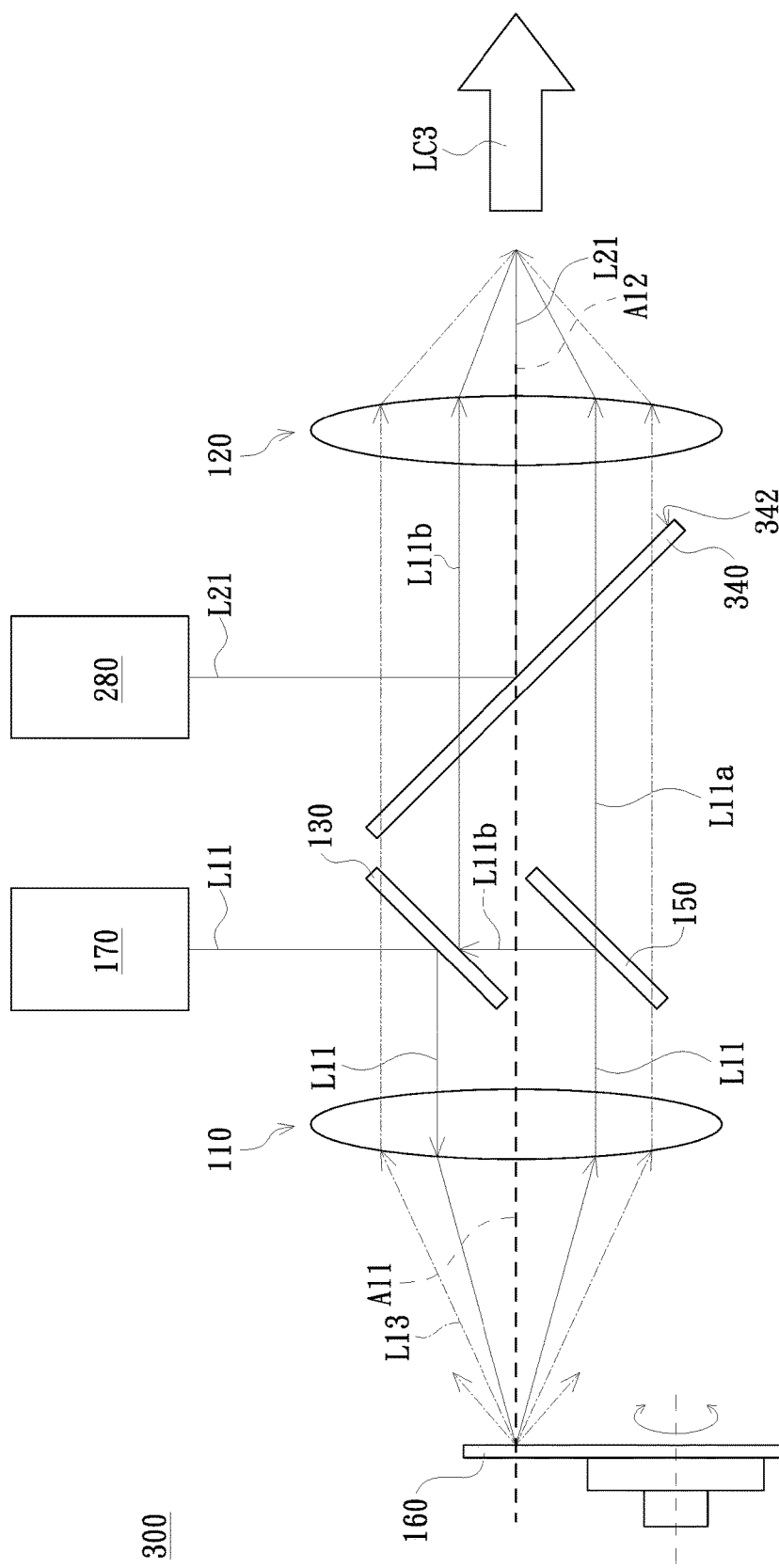
FIG. 3A is a schematic view of an illumination system in accordance with another embodiment of the invention.

FIG. 3A is a schematic view of an illumination system in accordance with another embodiment of the invention. Referring to FIG. 3A, the illumination system 300 shown in FIG. 3A is similar to the illumination system 100 shown in FIG. 1A. For example, the illumination systems 100 and 300 include the same elements such as the first lens set 110, the second lens set 120, the first dichroic element 130 and the beam splitter 150. However, different from the illumination system 100, the illumination system 300 further includes a supplemental light source 280 and a second dichroic member 340. The second dichroic member 340 is located between the first lens set 110 and the second lens set 120, and the first dichroic element 130 and the beam splitter 150 are both located between the second dichroic element 340 and the first lens set 110.

The supplementary light source 280 emits the supplemental beam L21 toward the second dichroic member 340, that is, the second dichroic element 340 is located on the transmission path of the supplemental beam L21. The second dichroic element 340 can reflect the supplemental beam L21 to the second lens set 120 and allow the first branch excitation beam L11a, the second branch excitation beam L11b and the converted beam L13 to pass therethrough. The first branch excitation beam L11a, the second branch excitation beam L11b and the converted beam L13 are incident into the second lens set 120 after passing through the second dichroic element 340, so that the second lens set 120 can converge the first branch excitation beam L11a, the second branch excitation beam L11b, the converted beam L13 and the supplemental beam L21 to the illumination beam LC3.

In addition, both the first optical axis A11 of the first lens set 110 and the second optical axis A12 of the second lens set 120 pass through the second dichroic element 340. The beam axis of the supplemental beam L21 may be coaxial with the second optical axis A12 so that the chief ray of the supplemental beam L21 can not only be transmitted along the direction parallel to the second optical axis A12 but also pass through the center of the second lens set 120, thereby facilitating the convergence of the supplemental beam L21 by the second lens set 120.

Figure 3B:
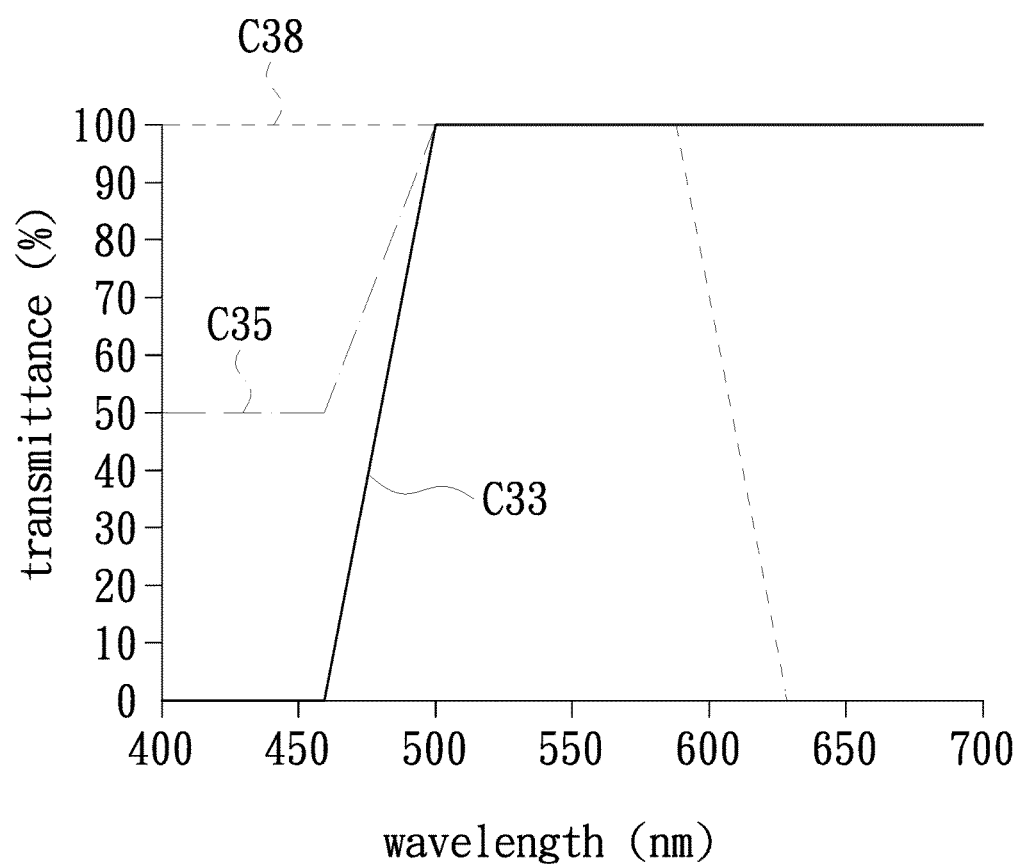
FIG. 3B is a schematic diagram of the transmittances of the first and second dichroic elements and the beam splitter in FIG. 3A, wherein the transmittances vary with wavelength.

FIG. 3B is a schematic diagram of the transmittances of the first and second dichroic elements and the beam splitter in FIG. 3A, where the transmittances vary with wavelength. Referring to FIGS. 3A and 3B, the line segments C33, C35 and C34 in FIG. 3B respectively represent the transmittances of the first dichroic element 130, the beam splitter 150 and the second dichroic element 340 for different wavelength ranges. Like FIG. 1B, the line segments C33, C35 and C34 are for illustration purposes only. From FIG. 3B, it can be seen that the transmittance of the second dichroic element 340 (line segment C34) for the light ray having a wavelength less than 630 nm is 100%, but is zero for the light ray having a wavelength greater than 630 nm. Therefore, the supplemental light source 280 may select red light with a wavelength greater than 630 nm so that the second dichroic element 340 can reflect the supplemental beam L21.

Figure 4:
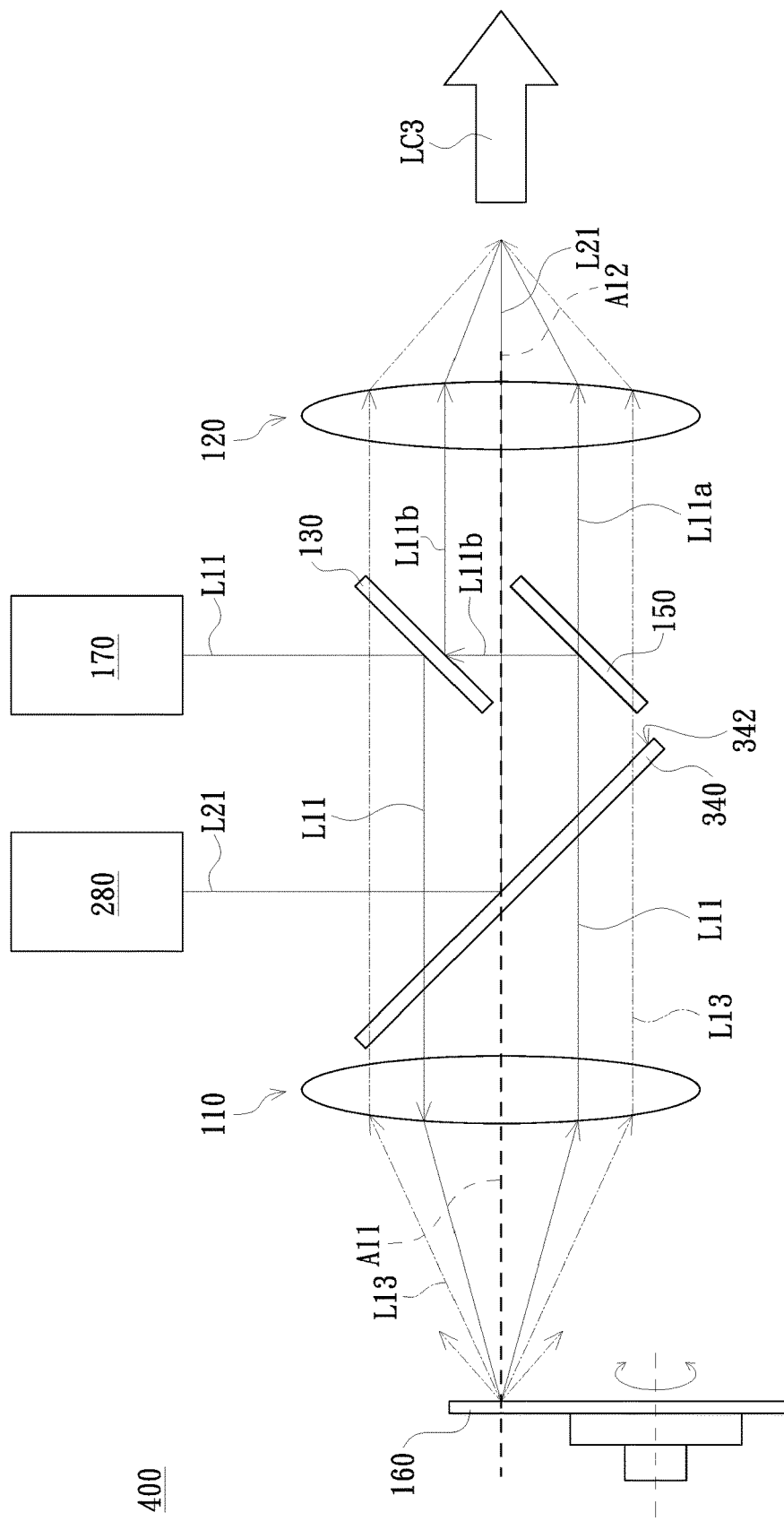
FIG. 4 is a schematic view of an illumination system in accordance with another embodiment of the invention.

FIG. 4 is a schematic view of an illumination system in accordance with another embodiment of the invention. Referring to FIG. 4, the illumination system 400 shown in FIG. 4 is similar to the illumination system 300 shown in FIG. 3A. However, the main differences between the illumination systems 300 and 400 are that the relative positions of the first dichroic element 130, the second dichroic element 340 and the beam splitter 150. Specifically, in the illumination system 400 shown in FIG. 4, both the first dichroic element 130 and the beam splitter 150 are located between the second dichroic element 340 and the second lens set 120, and the first lens set 110 is located between the wavelength-converting element 160 and the second dichroic element 340.

Therefore, the excitation beam L11 and the converted beam L13 transmitted from the first lens set 110 enter the beam splitter 150 after passing through the second dichroic element 340. That is, before the excitation beam L11 being split into the first branch excitation beam L11a and second branch excitation beam L11b by the beam splitter 150, the excitation beam L11 has passed through the second dichroic element 340. Therefore, different from the illumination system 300 shown in FIG. 3A, the first branch excitation beam L11a and the second branch excitation beam L11b do not pass through the second dichroic element 340. In addition, different from the embodiment shown in FIG. 3A, the positions of the exciting light source 170 and the supplemental light source 280 in FIG. 4 are reversed with respect to the positions of the same shown in FIG. 3A, so that the excitation beam L11 and the supplemental beam L21 can be respectively incident onto the first dichroic element 130 and the second dichroic element 340.

Figure 5:
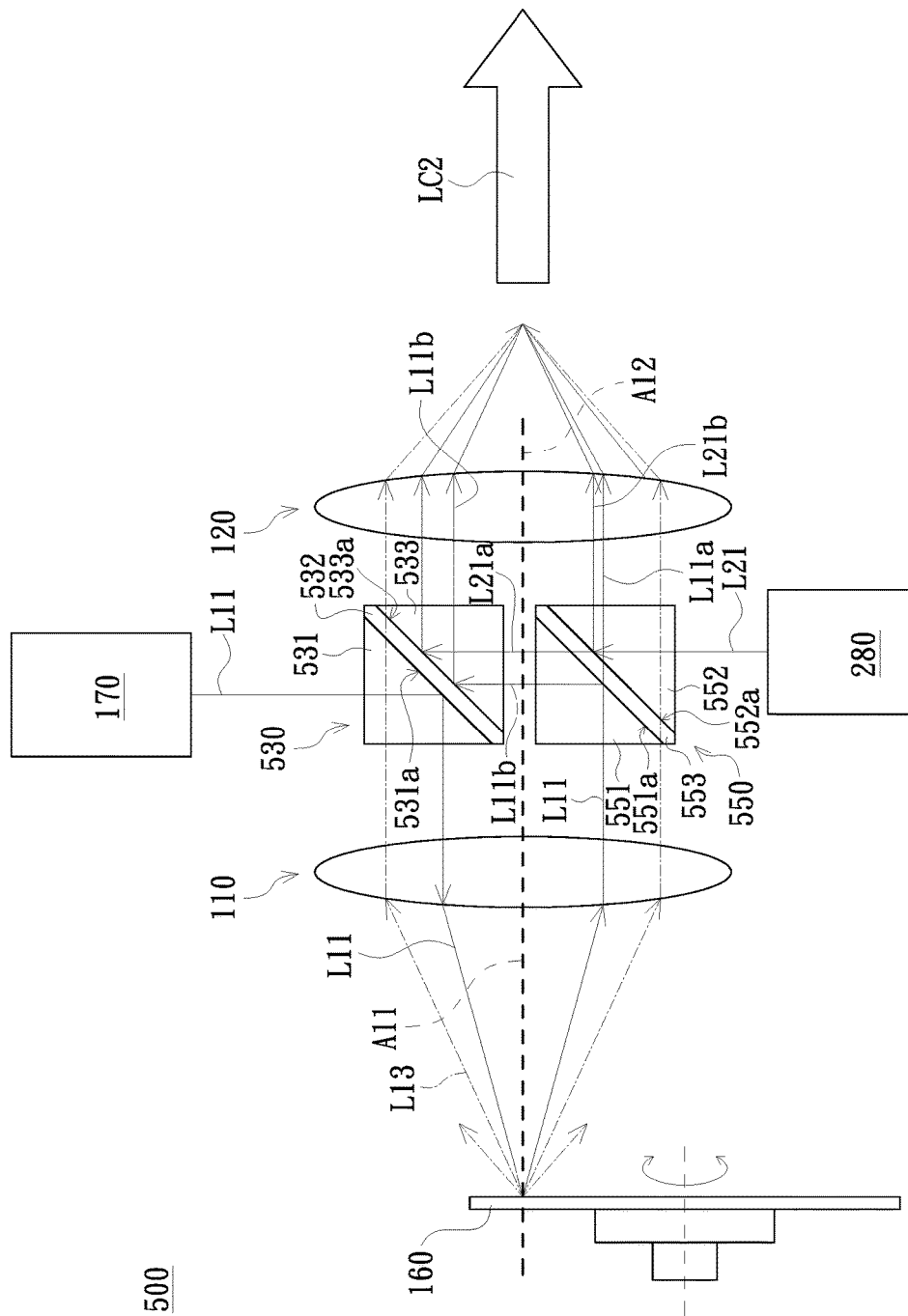
FIG. 5 is a schematic view of an illumination system in accordance with another embodiment of the invention.

FIG. 5 is a schematic view of an illumination system in accordance with another embodiment of the invention. Referring to FIG. 5, the illumination system 500 shown in FIG. 5 is similar to the illumination system 200 shown in FIG. 2A. For example, the illumination systems 200 and 500 include some of the same elements, and the arrangement of elements in the illumination system 500 is the same as that in the illumination system 200, wherein the illumination system 500 can also provide the illumination beam LC2. However, the illumination system 500 is different from the illumination system 200 merely in that the first dichroic element 530 and the beam splitter 550 included in the illumination system 500.

The first dichroic element 530 and the beam splitter 550 are respectively prism sets. Specifically, the first dichroic element 530 includes a first prism 531, a dichroic layer 532 and a second prism 533. The beam splitter 550 includes a first prism 551, a second prism 552 and a beam splitting layer 553. In the first dichroic element 530, the first prism 531 has a first prism surface 531a and the second prism 533 has a second prism surface 533a. The first prism surface 531a and the second prism surface 533a face each other, and the dichroic layer 532 is formed between the first prism surface 531a and the second prism surface 533a. In the beam splitter 550, the first prism 551 has a first prism surface 551a and the second prism 552 has a second prism surface 552a. The first prism surface 551a and the second prism surface 552a face each other, and the dichroic layer 553 is formed between the first prism surface 551a and the second prism surface 552a.

When the excitation beam L11 emitted from the exciting light source 170 is incident onto the first dichroic element 530 and the excitation beam L11 and the converted beam L13 from the first lens set 110 are incident onto the beam splitter 550, the excitation beam L11 and the converted beam L13 can be perpendicularly incident onto the outer side surfaces of both the first dichroic element 530 and the beam splitter 550, so as to reduce deflection of both of the excitation beam L11 and the converted beam L13, thereby achieving most or all of the excitation beams L11 and the converted beam L13 entering the second lens set 120. In addition, with the first dichroic element 530 and the beam splitter 550 shown in FIG. 5, under the condition of maintaining or enhancing the functions of the first dichroic element 130 and the beam splitter 150, the first dichroic element 130 and the beam splitter 150 in the above embodiment can also be modified into the prism set (the first color dichroic element 530 and the beam splitter 550) as shown in FIG. 5. Therefore, the illumination systems 100 to 400 of the above embodiments may also adopt the first dichroic element and the beam splitter in the form of a prism set.

Figure 6:
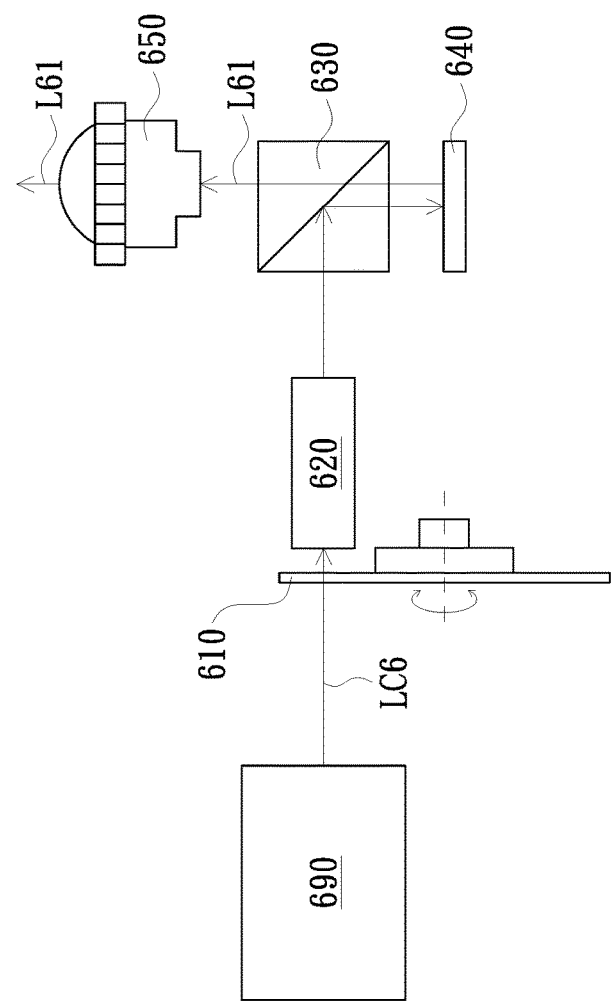
FIG. 6 is a schematic view of a projector in accordance with an embodiment of the invention.

The illumination system described in the above embodiments can be used in a projector. Please refer to FIG. 6, which illustrates a projector 600 in accordance with an embodiment of the invention. The projector 600 includes an illumination system 690, a filter wheel 610, a light homogenizer 620, a prism set 630, a light valve 640 and a projection lens 650. The illumination system 690 is one of the illumination systems 100 to 500 of the previous embodiments and may generate the illumination beam LC6, which can be the illumination beam LC1, LC2 or LC3. Therefore, the illumination beam LC6 is emitted from the second lens set 120.

The filter wheel 610, the light homogenizer 620, the prism set 630 and the light valve 640 are disposed on the transmission path of the illumination beam LC6. The illumination beam LC6 sequentially passes through the filter wheel 610, the light homogenizer 620, the prism set 630 and the light valve 640. The filter wheel 610 has a light penetration portion and a plurality of light filter portions (none of which are shown) and is rotatable with respect to the illumination beam LC6 to select the light penetration portion or the light filter portions to be illuminated by the illumination beam LC6. The filter wheel 610 rotates with the wavelength-converting element (e.g., the wavelength-converting element 160) to illuminate different illumination beams LC6 at different positions of the filter wheel 610.

In detail, when the illumination beam LC6 is the converged excitation beam L11, the illumination beam LC6 is incident into the light penetration portion of the filter wheel 610 and directly penetrates the light penetration portion. The light penetration portion does not change the color of the illumination beam LC6 (excitation beam L11), so the color of the illumination beam LC6 remains unchanged after penetrating the light penetration portion. When the illumination beam LC6 is a converged converted beam L13, the illumination beam LC6 is incident into the filter portion of the filter wheel 610 so that the filter wheel 610 can filter the illumination beam LC6 (converted beam L13), wherein the filtered illumination beam LC6 will differ from the color of the unfiltered illumination beam LC6. In another embodiment, a scattering element (not shown) may be disposed at the light penetration portion of the filter wheel 610 for scattering the excitation beam L11 and breaking the coherence of the excitation beam L11.

The light homogenizer 620 is disposed on the transmission path of the illumination beam LC6 passing through the filter wheel 610 and can homogenize the illumination beam LC6. The prism set 630 is disposed on the transmission path of the illumination beam LC6 transmitted from the light homogenizer 620 and reflects the illumination beam LC6 to the light valve 640. The light valve 640 can convert the illumination beam LC6 into an image beam L61. The light valve 640 can be a liquid crystal on silicon (LCOS) or a digital micromirror device (DMD). The projection lens 650 is disposed on the transmission path of the image beam L61 and can project the image beam L61 on the screen to form an image.

In summary, in the above embodiments, the excitation beam passes through the first lens set in the direction parallel to the optical axis of the first lens set, but the beam axis of the excitation beam and the optical axis of the first and second lens sets are noncoaxial, so that the two excitation beams from the first dichroic element and the reflective region of the wavelength-converting element respectively enter different two half parts of the first lens set (for example, the first half part 111 and second half part 112) along different transmission paths. Therefore, the excitation beam passes through the first lens set twice to facilitate narrowing the distribution range of the transmission path of the excitation beam, thereby helping the projector to be miniaturized.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising: an illumination system, a light valve and a projection lens, wherein
   the illumination system comprises: an exciting light source, a first lens set, a first dichroic element, a wavelength-converting element and a beam splitter, wherein the exciting light source is configured to emit an excitation beam, wherein the excitation beam has a beam axis;

the first lens set has a first optical axis;

the first dichroic element is located between the first lens set and the exciting light source on a transmission path of the excitation beam, the first dichroic element is configured to reflect the excitation beam and transmit the excitation beam to the first lens set, wherein the excitation beam is incident into the first lens set in a direction parallel to the first optical axis, and the beam axis of the excitation beam incident into the first lens set is noncoaxial with the first optical axis of the first lens set;

the wavelength-converting element is located on a transmission path of the excitation beam transmitted from the first lens set and has a reflective region and a wavelength-converting region, wherein when the wavelength-converting region is located on a transmission path of the excitation beam, the wavelength-converting region is configured to convert the excitation beam into a converted beam and reflect the converted beam to the first lens set, wherein the converted beam transmitted from the first lens set is used to pass through the first dichroic element;

wherein when the reflective region is on a transmission path of the excitation beam, the reflective region is configured to reflect the excitation beam to the first lens set; and the beam splitter is located on a transmission path of the excitation beam and the converted beam transmitted from the first lens set and is configured to split the excitation beam into a first branch excitation beam and a second branch excitation beam, wherein the beam splitter allows the first branch excitation beam to pass therethrough and reflects the second branch excitation beam to the first dichroic element, the beam axis of the excitation beam incident onto the beam splitter from the first lens set is noncoaxial with the beam axis of the excitation beam incident into the first lens set from the first dichroic element, and the converted beam transmitted from the first lens set is used to pass through the beam splitter;

the light valve is disposed on a transmission path of an illumination beam and configured to convert the illumination beam into an image beam; and the projection lens is disposed on a transmission path of the image beam.

2. The projector according to claim 1, further comprising:
a second lens set, located on a transmission path of the converted beam transmitted from the first dichroic element and the beam splitter, the first branch excitation beam transmitted from the beam splitter, and the second branch excitation beam transmitted from the first dichroic element, wherein the second lens set is configured to converge the converted beam, the first branch excitation beam and the second branch excitation beam into the illumination beam, wherein the first dichroic element and the beam splitter are disposed between the first lens set and the second lens set.

3. The projector according to claim 2, wherein the second lens set has a second optical axis, and the first branch excitation beam and the second branch excitation beam are incident into the second lens set in a direction parallel to the second optical axis, wherein the second optical axis is located between a first sub-beam axis of the first branch excitation beam and a second sub-beam axis of the second branch excitation beam.

4. The projector according to claim 3, wherein the first optical axis is coaxial with the second optical axis.

5. The projector according to claim 1, wherein the first dichroic element has a first dichroic surface and a second dichroic surface, the second dichroic surface is opposite to the first dichroic surface, the beam splitter has a beam splitting surface, the first dichroic surface is configured to reflect the excitation beam to the first lens set, the beam splitting surface is configured to reflect the second branch excitation beam to the second dichroic surface, so that the second dichroic surface is configured to reflect the second branch excitation beam to the second lens set, wherein the second dichroic surface is parallel to the beam splitting surface.

6. The projector according to claim 1, wherein the first dichroic element comprises:
a first prism, having a first prism surface;
a second prism, having a second prism surface, wherein the first prism surface and the second prism surface face each other; and
a dichroic layer, formed between the first prism surface and the second prism surface.

7. The projector according to claim 1, wherein the beam splitter comprises:
a first prism, having a first prism surface;
a second prism, having a second prism surface, wherein the first prism surface and the second prism surface face each other; and
a dichroic layer, formed between the first prism surface and the second prism surface.

8. The projector according to claim 1, further comprising:
a supplemental light source, configured to emit a supplemental beam towards the beam splitter, wherein the beam splitter splits the supplemental beam into two branch supplemental beams, the beam splitter and the first dichroic element respectively reflect the branch supplemental beams to the second lens set, and the beam splitter is located between the first dichroic element and the supplemental light source.

9. The projector according to claim 1, further comprising:
a supplemental light source, configured to emit a supplemental beam; and
a second dichroic element, configured to reflect the supplemental beam to the second lens set, wherein the converted beam passes through the second dichroic element, and the second dichroic element is located between the first lens set and the second lens set.

10. The projector according to claim 9, wherein the first dichroic element and the beam splitter are both located between the second dichroic element and the first lens set, and the first branch excitation beam, the second branch excitation beam and the converted beam are used to enter the second lens set after passing through the second dichroic element.

11. The projector according to claim 9, wherein the first dichroic element and the beam splitter are both located between the second dichroic element and the second lens set, and the excitation beam are used to pass through the second dichroic element.

12. An illumination system, comprising: an exciting light source, a first lens set, a first dichroic element, a wavelength-converting element and a beam splitter, wherein the exciting light source is configured to emit an excitation beam, wherein the excitation beam has a beam axis;

the first lens set has a first optical axis;

the first dichroic element is on a transmission path of the excitation beam and located between the first lens set and the exciting light source, the first dichroic element is configured to reflect the excitation beam and transmit the excitation beam to the first lens set, wherein the excitation beam is incident into the first lens set in a direction parallel to the first optical axis, and the beam axis of the excitation beam incident into the first lens set is noncoaxial with the first optical axis of the first lens set;

the wavelength-converting element is located on a transmission path of the excitation beam transmitted from the first lens set and has a reflective region and a wavelength-converting region, wherein when the wavelength-converting region is located on a transmission path of the excitation beam, the wavelength-converting region is configured to convert the excitation beam into a converted beam and reflect the converted beam to the first lens set, wherein the converted beam transmitted from the first lens set is used to pass through the first dichroic element;

wherein when the reflective region is on a transmission path of the excitation beam, the reflective region is configured to reflect the excitation beam back to the first lens set; and the beam splitter is located on a transmission path of the excitation beam and the converted beam transmitted from the first lens set and is configured to split the excitation beam into a first branch excitation beam and a second branch excitation beam, wherein the beam splitter allows the first branch excitation beam to pass therethrough and reflects the second branch excitation beam to the first dichroic element, the beam axis of the excitation beam incident onto the beam splitter from the first lens set is noncoaxial with the beam axis of the excitation beam incident into the first lens set from the first dichroic element, and the converted beam transmitted from the first lens set is used to pass through the beam splitter.

13. The illumination system according to claim 12, further comprising:

a second lens set, located on a transmission path of the converted beam transmitted from the first dichroic element and the beam splitter, the first branch excitation beam transmitted from the beam splitter and the second branch excitation beam transmitted from the first dichroic element, wherein the second lens set is configured to converge the converted beam, the first branch excitation beam and the second branch excitation beam into an illumination beam, wherein the first dichroic element and the beam splitter are disposed between the first lens set and the second lens set.

14. The illumination system according to claim 13, wherein the second lens set has a second optical axis, and the first branch excitation beam and the second branch excitation beam are incident into the second lens set in a direction parallel to the second optical axis, wherein the second optical axis is located between a first sub-beam axis of the first branch excitation beam and a second sub-beam axis of the second branch excitation beam.

15. The illumination system according to claim 12, wherein the first optical axis is coaxial with the second optical axis.

16. The illumination system according to claim 12, wherein the first dichroic element has a first dichroic surface and a second dichroic surface, the second dichroic surface is opposite to the first dichroic surface, the beam splitter has a beam splitting surface, the first dichroic surface is configured to reflect the excitation beam to the first lens set, the beam splitting surface is configured to reflect the second branch excitation beam to the second dichroic surface, so that the second dichroic surface is configured to reflect the second branch excitation beam to the second lens set, wherein the second dichroic surface is parallel to the beam splitting surface.

17. The illumination system according to claim 12, wherein the first dichroic element comprises:

a pair of prisms, comprising a first prism and a second prism, wherein the first prism and the second prism respectively have a first prism surface and a second prism surface, and the first prism surface and the second prism surface face each other; and a dichroic layer, formed between the first prism surface and the second prism surface.

18. The illumination system according to claim 12, wherein the beam splitter comprises:

a pair of prisms, comprising a first prism and a second prism, wherein the first prism and the second prism respectively have a first prism surface and a second prism surface, and the first prism surface and the second prism surface face each other; and a dichroic layer, formed between the first prism surface and the second prism surface.

19. The illumination system according to claim 12, further comprising:

a supplemental light source, configured to emit a supplemental beam towards the beam splitter, wherein the beam splitter splits the supplemental beam into two branch supplemental beams, the beam splitter and the first dichroic element respectively reflect the branch supplemental beams to the second lens set, and the beam splitter is located between the first dichroic element and the supplemental light source.

20. The illumination system according to claim 12, further comprising:

a supplemental light source, configured to emit a supplemental beam; and a second dichroic element, configured to reflect the supplemental beam to the second lens set, wherein the converted beam passes through the second dichroic element, and the second dichroic element is located between the first lens set and the second lens set.

21. The illumination system according to claim 20, wherein the first dichroic element and the beam splitter are both located between the second dichroic element and the first lens set, and the first branch excitation beam, the second branch excitation beam and the converted beam are used to enter the second lens set after passing through the second dichroic element.

22. The illumination system according to claim 20, wherein the first dichroic element and the beam splitter are both located between the second dichroic element and the second lens set, and the excitation beam are used to pass through the second dichroic element.

* * * * *